Oct. 27, 1970    YASUMORI KURIHARA    3,536,430

AUTOMATIC STRAPPING MACHINE

Filed Nov. 13, 1968    5 Sheets-Sheet 1

INVENTOR
YASUMORI KURIHARA

BY *Wenderoth, Lind & Ponack*

ATTORNEYS

Oct. 27, 1970  YASUMORI KURIHARA  3,536,430

AUTOMATIC STRAPPING MACHINE

Filed Nov. 13, 1968 5 Sheets-Sheet 4

INVENTOR
YASUMORI KURIHARA

BY Wenderoth, Lind & Ponack
ATTORNEY

3,536,430
AUTOMATIC STRAPPING MACHINE
Yasumori Kurihara, Kawasaki, Japan, assignor to Ikegai Tekko Kabushiki Kaisha, Tokyo, Japan
Filed Nov. 13, 1968, Ser. No. 775,415
Claims priority, application Japan, Nov. 21, 1967, 42/74,403, 42/97,518; July 10, 1968, 43/47,818
Int. Cl. B65b 13/04
U.S. Cl. 100—4          3 Claims

ABSTRACT OF THE DISCLOSURE

The automatic strapping machine having a feed roller which, in its forward rotation, pushes a feed strap around a package to be strapped and, in its reverse rotation, draws the strap tightly around the package. The feed roller is rotated in the forward or reverse direction by the swing of a rocker arm in clockwise or counterclockwise direction about a pivot, being swung by a cam. The cam has two segments on its outer periphery, one of a smaller diameter and the other of a larger diameter, respectively, to swing the rocker arm so that one rotation of the cam causes the feed roller to rotate in the forward and reverse directions for a respective time, depending on the length of the segments.

BACKGROUND OF THE INVENTION

This invention relates to an automatic machine for binding boxes, packages and the like with a tensioned loop of strap material, and more particularly to a strap feed and fastening device therefor.

In a conventional strap feed and fastening device for an automatic strapping machine, the strap is fed through a strap feed roller from a roll of strap to a yoke arranged around a package to be strapped, and when it is detected by a limit switch or the like that the leading edge of the strap has reached one end of the yoke, the feed of the strap is stopped by the electrical signal issued from the limit switch or the like. After stopping the strap feed, the strap is fastened around the article by either rotating the feed roller in the direction opposite to the feed direction or engaging the strap with a separate roller which is rotating in said direction.

Thus, in a conventional strapping machine, since the motion for the feed, stop and fastening of the strap is carried out according to the electrical signals, the electrical wiring is complicated, and, further, since the signals are issued by the detection of the leading edge of the strap, they are affected by the shape of the leading edge of the strap so the operation of the apparatus is unreliable. Moreover, because the feed of the strap is stopped by the electrical signal issued by the detection of the leading edge of the strap, the position at which the strap is stopped varies with the fluctuation in the operation of the various electrical devices and the inertia forces of the mechanical moving parts. Since such fluctuation becomes greater as the speed of the machine increases, the feed speed of the strap, that is, the strapping speed of the machine, is limited.

SUMMARY OF THE INVENTION

An object of the present invention is to provide an automatic strapping machine in which the feed, stop and fastening of the strap are performed without electrical signals issued by detection of the leading edge of the strap.

A further object of the present invention is to provide an automatic strapping machine which utilizes a cam to divide one cycle of the strapping operation into the feed, stop and fastening periods.

Another object of the present invention is to provide an automatic strapping machine in which variation in the position of the leading edge of the strap due to fluctuation in the inertia force of the mechanical moving parts can be excluded.

Still another object of the present invention is to provide an automatic strapping machine in which the strap is prevented from being broken due to rubbing with the feed roller during the fastening period of the strapping operation cycle.

A further object of the invention is to provide an automatic strapping machine in which the fastening of the strap is carried out equally well irrespective of the dimensions of the package to be strapped with a constant cycle of the strapping operation.

In accordance with one embodiment of the invention, the automatic strapping machine has a table for supporting a package in strapping position, a guide rail for guiding a strap between a roller for feeding or fastening said strap and a pressure roller, a strap gripper, a strap guide, and a yoke for leading the strap in a loop around the package. The machine has a first shaft to which is secured said feed roller, a first gear and a first driving disc, a second shaft to which is secured a second driving disc and a clutch means engageable with a second gear mounted thereon. When said clutch is actuated, said second gear is engaged with said first gear to rotate said feed roller in a direction opposite to the feed direction. A rocker arm is provided having two discs and a cam follower roller at its respective ends, each of said discs being rotatable on shafts secured to said rocker arm through a gear integral therewith which meshes with a gear secured to a driving shaft connected to a prime mover through transmitting means. The rocker arm is swingable about said driving shaft clockwise or counterclockwise by the action of said cam follower roller following a cam which is rotated by a cam shaft rotated by said prime mover through reduction gears. The cam has a configuration which swings said rocker arm in a clockwise or counterclockwise direction so that one or the other of said discs engages with said first or second driving disc for a predetermined time within a cycle of the strapping operation.

In accordance with the second embodiment of the invention, the automatic strapping machine of the first embodiment is provided with a guide rail formed with a slit in its upper wall and a strap guide formed with a stop, so that, during the feeding period of the strapping operation, when the strap is stopped with its leading edge being in contact with said stop, the excess portion of the strap is thrust out of said guide rail through said slit.

In accordance with the third embodiment of the invention, the automatic strapping machine of the first embodiment is provided with a roller secured to a one-way clutch mounted on one of said shafts secured to said rocker arm, said roller being adapted to be engaged with a roller integral with said second gear, and a strap detecting means is disposed near the end of said yoke where the strap is pulled out therefrom at the final stage of the fastening period of the strapping operation. Said clutch is released upon receipt of an electrical signal issued from said strap detecting means.

The automatic strapping machine according to the present invention has the advantage that the feed roller is caused to rotate in a feed direction and the opposite direction for the respective time necessary for feeding and fastening the strap by the cam, and there is no necessity to detect the leading edge of the strap to reverse the feed roller. Consequently, the construction of the feed mechanism is relatively simple and trouble during its operation is reduced.

The automatic strapping machine according to the present invention has also the advantage that, by the provision of the slit in the guide rail and the stop on the strap guide, if there is an excess of strap fed at the time of contact of the leading edge of the strap with the stop due to the inertia force of the rotating mechanical parts, the excess portion of the strap is thrust out from the guide rail through the slit, whereas the position of the end of the strap is always kept constant by the stop.

Moreover, the automatic strapping machine according to the present invention has the advantage that, since the clutch is released in the last stage of the fastening period of strapping by an electrical signal, the danger of severing of the strap due to rubbing by the feed roller is excluded.

BRIEF DESCRIPTION OF THE DRAWINGS

These and other objects of the present invention will become more apparent to those skilled in the art when considered in reference to the following description in the light of the accompanying drawings, in which like numerals indicate like parts throughout the figures thereof, and wherein.

DESCRIPTION OF THE PREFERRED EMBODIMENT

Figure 1:
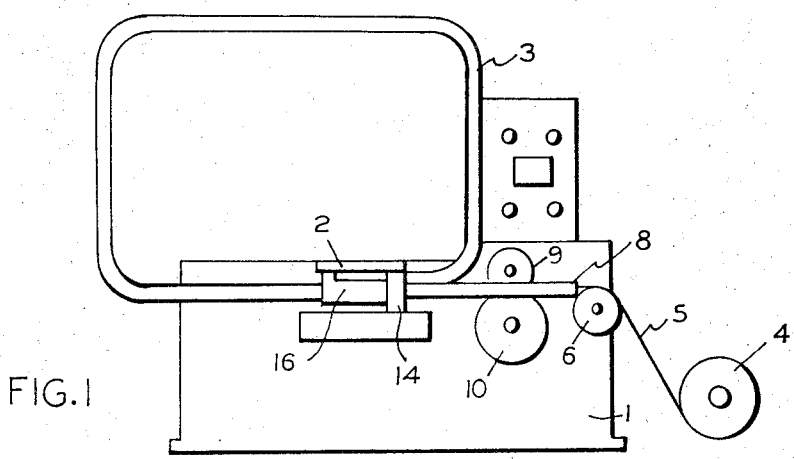
FIG. 1 is a diagrammatic elevational view of an automatic strapping machine according to the present invention.

Referring to FIG. 1 of the drawings, there is shown an automatic strapping machine according to the present invention. The machine comprises a base section 1 containing the various operating mechanisms. The top of base 1 forms a table 2 on which a package to be strapped may be rested within the confines of a yoke 3 surrounding table 2. A roll 4 of strap material is mounted alongside the machine, and the strap 5 from the roll is directed around a guide 6 and along a slot 7 of a guide rail 8 to a point where it is engaged with a feeding and tensioning mechanism, as will presently be explained, for push feeding the strap through the yoke.

Figure 15:
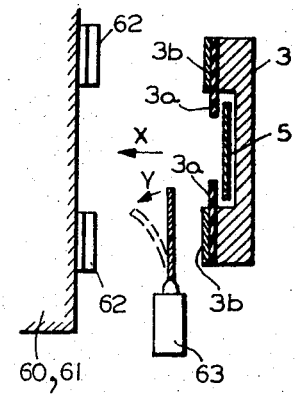
FIG. 15 is a sectional view of a portion near the end of the yoke taken along the line XV—XV of FIG. 14.
Figure 16:
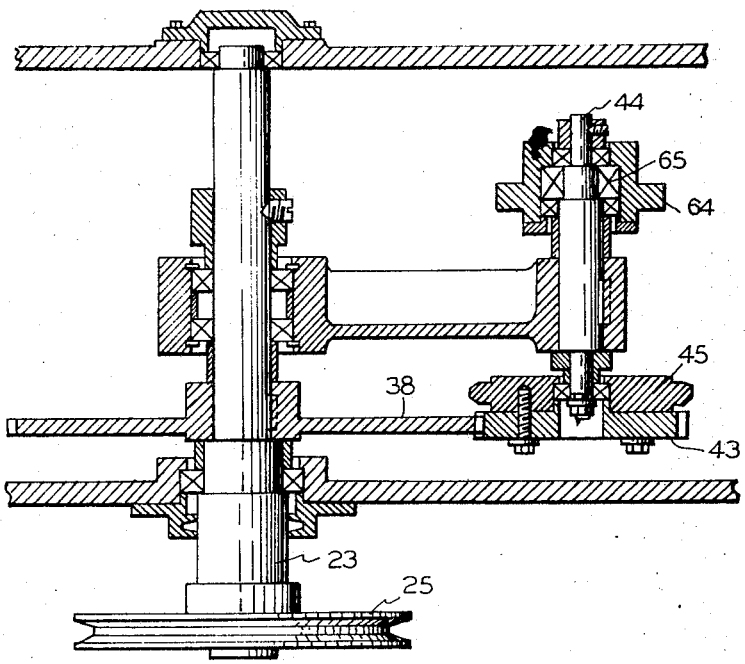
FIG. 16 is a sectional view of FIG. 6 viewed in the direction of arrows XVI—XVI.

As shown in section in FIG. 15, yoke 3 is a channel member having an open side facing inwardly of the loop formed by the yoke. Along the outer edge of each leg portion of the channel member, a flexible band 3a made of a material like rubber is secured by a rigid strip 3b made of a material like steel, there being a space between the two bands 3a. The bands 3a form a guide together with the web of the channel member so as to slidable and guidingly confine strap 5 to the contour of yoke 3 as the strap is push fed therearound. As will presently be explained, the strap is fed around the yoke so as to form a strap loop prior to the placement of the package in the strapping position and bands 3a of yoke 3 not only serve to guide the strap but to support it against the yoke until such time as the loop is drawn tight about the package. During the actual strapping operation, as the strap is tensioned it pushes aside the bands 3a and escapes from the yoke and is drawn down against the package.

Figure 2:
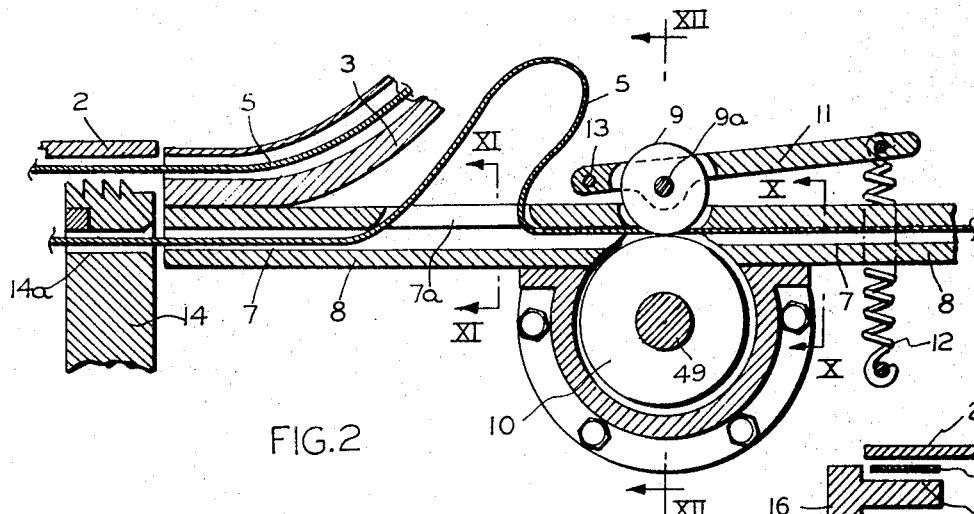
FIG. 2 is a partial sectional elevational view of an embodiment of a feed roller and its related portions.

Referring now to FIG. 2, strap 5 is passed between a presser roller 9 and a feed roller 10, the former presses the strap against the outer periphery of the latter with a force which is applied to pressure roller 9 through its pivot 9a by a lever 11 and a tension spring 12. Lever 11 is rotatable about a pivot 13 and spring 12 is arranged between the other end of lever 11 and the machine base.

Figure 4:
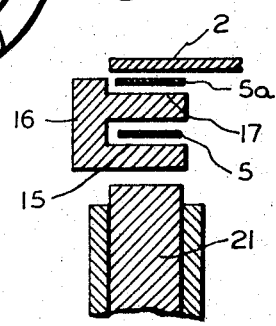
FIG. 4 is a transverse sectional view of the strap guiding portion taken along the line IV—IV of FIG. 3.
Figure 3:
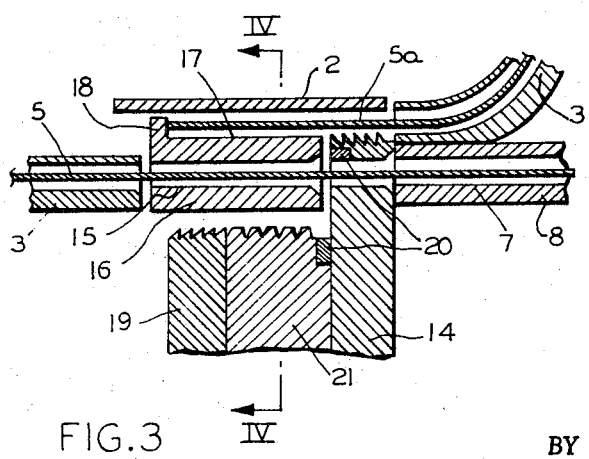
FIG. 3 is a partial sectional elevational view of an example of the strap guiding portion in a conventional automatic strapping machine.

When feed roller 10 rotates in a counterclockwise direction, the strap is pushed away from roll 4 through slot 7 toward yoke 3 by the frictional driving force of feed roller 10. The strap 5 passes through a hole 14a in a strip gripper 14 and enters into a slit 15 in a strap guide 16 (see FIG. 3). Then, it is guided to yoke 3, and after travelling around the package (not shown), guided by yoke 3, the leading edge of strap 5 leaves yoke 3 and goes into the space between the underside of table 2 and strap gripper 14, entering into a groove 17 formed on strap guide 16, the exit of yoke 3 being disposed above guide rail 8 (see FIG. 3). Because strap guide 16 has a stop 18 at its upper end portion, strap 5 stops its movement when its end abuts stop 18. At this time, strap gripper 14 is raised by a cam and link mechanism (not shown) to pinch strap 5 between it and the under surface of table 2. Then, strap guide 16 moves leftward, as viewed in FIG. 4, and feed roller 10 begins to rotate reversely or clockwise. Because its end is pinched, the strap is pulled back due to the clockwise rotation of feed roller 10, so that it escapes inwardly from yoke 3, thrusting aside flexible bands 3a and tightens around the package (see FIG. 14). After tightening, strap 5 is grasped between a strap presser 19 and the under surface of table 2, and severed by a pair of cutters 20, and the overlapped portions 5 and 5a of the strap are joined together by a joining element 21.

Figure 5:
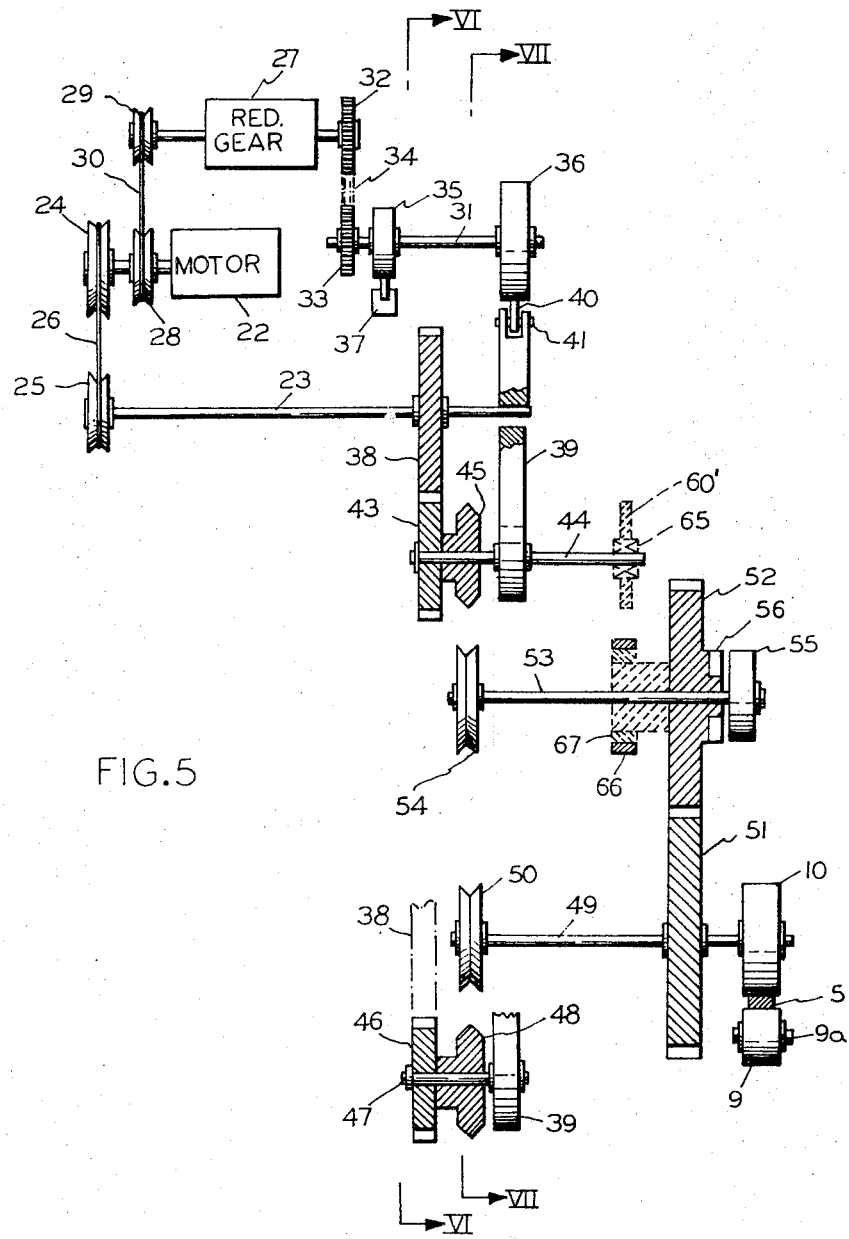
FIG. 5 is a diagrammatic view showing the driving system for an automatic strapping machine in accordance with the first embodiment of the present invention.

FIG. 5 shows a driving system for rotating feed roller 10 in the forward or reverse direction in the first embodiment according to the present invention. The rotation of a motor 22 is transmitted to a driving shaft 23 through pulleys 24 and 25 and V-belt 26 one one hand, and to an input shaft of a reduction gear 27 through pulleys 28 and 29 and a V-belt 30 on the other hand. The reduction gear 27 rotates a cam shaft 31 at a low speed through a sprocket 32 keyed to an output shaft of reduction gear 27 and a spocket wheel 33 keyed to the cam shaft 31 and a chain 34 reeved round the two wheels 32 and 33. Rigidly secured to cam shaft 31 are two cams 35 and 36. Cam 35 has a segment of larger diameter adapted to actuate a limit switch 37 connected to motor 22 so that each revolution of cam shaft 31 causes one cycle of the strapping operation necessary to the strapping machine, and at the end of the cycle the segment of cam 35 actuates the switch 37 to stop the rotation of motor 22. The cam 36 function to rotate feed roller 10 forwardly or reversely, as will presently be explained.

Figure 6:
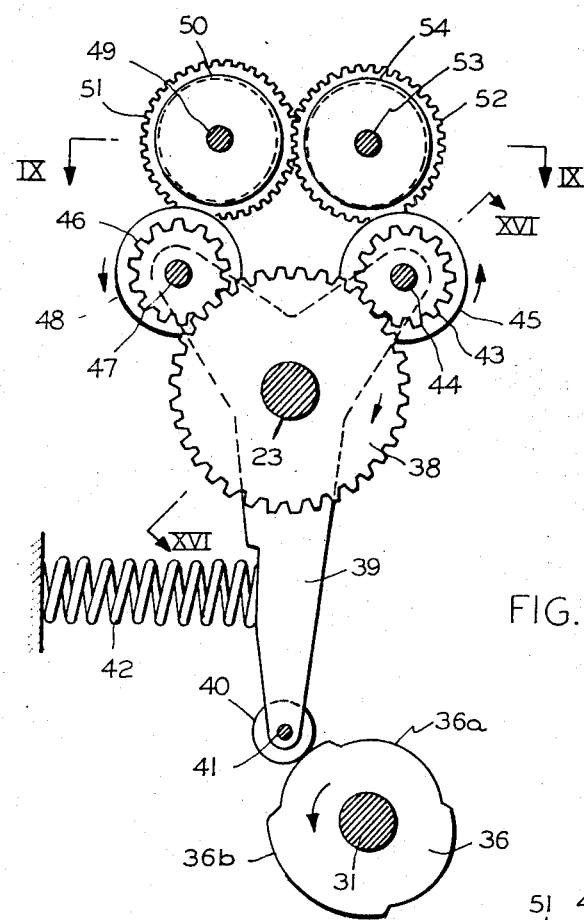
FIG. 6 is an elevational view of the rocker arm viewed in the direction of arrows VI—VI in FIG. 5.

Fixedly secured on shaft 23 is a gear 38 and rotatably mounted on shaft 23 is a rocker arm 39, which has there on a follower roller 40 rotatably mounted on a pivot 41 secured to the lower end of rocker arm 39. The roller 40 is pressed against the outer periphery of cam 36 by a spring 42 connected between rocker arm 39 and the machine bed (see FIG. 6). Rocker arm 39 has two sets of elements thereon, each consisting of a gear, a shaft, and a disc, which are rotatably mounted at the upper end thereof, one set being a gear 43, a shaft 44, a disc 45, and the other being a gear 46, a shaft 47, a disc 48. Gears 43 and 46 are rotatably mounted on shafts 44 and 47, respectively. Gears 43 and 46 are integral with discs 45 and 48 respectively, and both mesh with gear 38 secured to shaft 23.

A shaft 49, having feed roller 10 fixed on one end thereof, has a driving disc 50 and a gear 51 fixedly secured thereto. Gear 51 meshes with a gear 52 rotatably mounted on a shaft 53, fixedly secured to the ends of which is a driving disc 54 and a clutch 55, respectively. In the embodiment shown, clutch 55 is shown as a magnetic clutch as an example. Gear 52 has a boss at its one end opposed to clutch 55, on which boss is mounted an axially movable armature 56 so that, upon energizing magnetic clutch 55, armature 56 cooperates with it to transmit the rotation of shaft 53 to gear 52. Discs 45 and 48, and the driving discs 50 and 54, are arranged in opposed relation, respectively, and each of discs 45 and 48 has a V-shaped protrusion on its periphery, while each of driving discs 50 and 54 has an inverse V-shaped concavity on its periphery, and upon engagement of the protrusion and the concavity, the rotation of the disc is adapted to be transmitted to the driving disc by friction. Thus, during engagement of discs 48 and 45 with driving discs 50 and 54, respectively, the rotation of motor 22 is transmitted to either shaft 49 to rotate feed roller 10 in a forward direction, or shaft 53 to rotate feed roller 10 in the reverse direction through clutch 53, armature 56, gears 52 and 51 and shaft 49.

Cam 36 has a segment 36a of smaller diameter and a segment 36b of larger diameter, and segments 36a and 36b engage cam follower roller 40 to swing rocker arm 39 about shaft 23 in the counterclockwise or clockwise direction, respectively.

The operation of the driving system shown in FIG. 5 is as follows.

Figure 7:
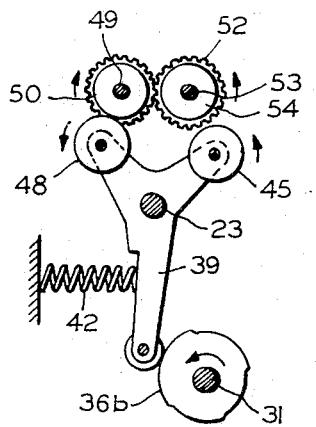
FIG. 7 is an elevational view of the rocker arm in a strap feed state viewed in the direction of arrows VII—VII in FIG. 5.
Figure 8:
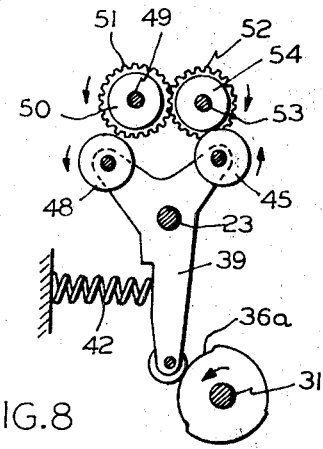
FIG. 8 is a view similar to FIG. 7, but in a strap fastening state.
Figure 9:
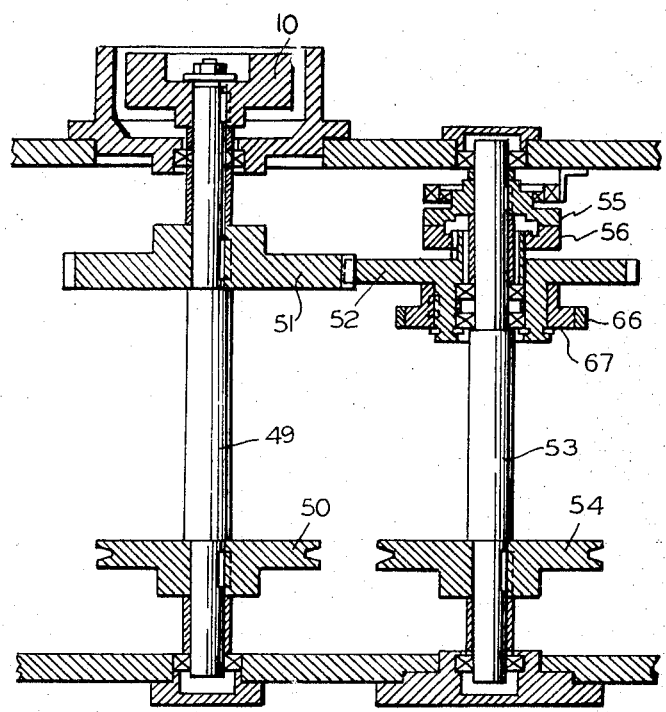
FIG. 9 is a sectional plan view of FIG. 6 viewed in the direction of arrows IX—IX.
Figure 11:
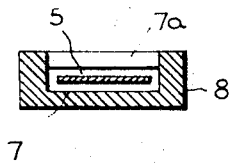
FIGS. 10 and 11 are transverse sectional views of the guide rail taken along the lines X—X and XI—XI of FIG. 2, respectively.
Figure 10:
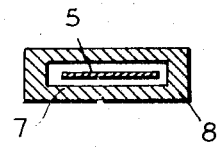
Figure 12:
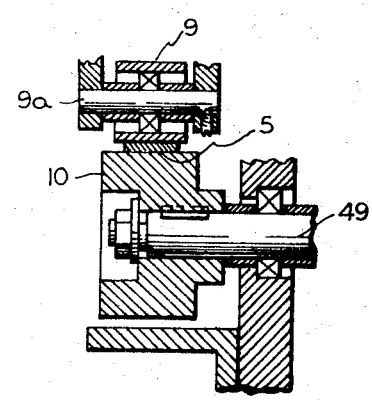
FIG. 12 is a vertical sectional view of the feed roller taken along the line XII—XII of FIG. 2.

Due to the configuration of the outer periphery of cam 36, rocker arm 39 is swung clockwise or counterclockwise about shaft 23 under the action of spring 42 extending between the arm 39 and the machine base, so that either disc 48 engages with driving disc 50 (FIG. 7), or disc 45 engages with driving disc 45 (FIG. 8), causing feed roller 10 to rotate either in a forward or in a reverse direction. In the particular embodiment shown in FIG. 7, when disc 48 engages with driving disc 50, feed roller 10 is rotated in the counterclockwise direction to feed strap 5, while when the disc 45 engages with driving disc 54, as shown in FIG. 8, feed roller 10 is rotated in the clockwise direction through magnetic clutch 55, 56 and gears 52 and 51 to pull the strap 5 tight. Thus, when motor 22 is started and magnetic clutch 55 is energized, each rotation of cam shaft 31 causes one cycle of the strapping operation successively, that is:

(1) Feed roller 10 is forcedly rotated in the reverse direction.

(2) As the clutch slips, feed roller 10 stops tightening of the strap 5.

(3) The rotation of the clutch is stopped.

(4) The severing and joining of strap 5 are performed.

(5) Feed roller 10 is rotated in a positive direction to feed strap 5.

(6) The rotation of feed roller 10 is stopped, resulting in the stoppage of the feed of strap 5.

(7) Upon complettion of one cycle, the motor 22 is de-energized.

Thus, according to the first embodiment of the present invention, since the times during which the feed roller is rotated in the forward and the reverse directions are determined solely by the configuration of the cam, it is not necessary to detect the leading edge of the strap, which makes the constitution of the machine simpler and decreases the possibility of trouble during operation.

FIGS. 2, 9, 10 and 11 show the second embodiment of the present invention. In this embodiment, guide rail 8, which has an elongated rectangular slot 7 for guiding the strap, has a slit 7a in the upper wall thereof between feed roller 10 and strap gripper 14, and slit 7a is so dimensioned that the strap can be forced out therethrough, for a purpose which will presently be explained. The present machine is also operated through the driving systems similar to the first embodiment. Since the duration of rotation of feed roller 10 is determined by cam 36, if cam 36 is designed so as to feed a length of strap the same as the length of the inner periphery of yoke 3, feed roller 10 always feeds a definite length of strap apart from the variation in length due to the inertia of the moving parts of the driving system such as feed roller 10. And, if the length of strap fed is greater than the length previously determined, the portion of the strap over and above the length previously determined will be forced out through the slit 7a. The nearer the strap 5 comes to the exit of yoke 3, the weaker becomes the feeding force; in other words, the feeding force is the strongest near the feed roller 10. Therefore, strap 5 tends to be buckled at the position of slit 7a, and upon the leading edge of the strap contacting stop 18, the strap is buckled at the slit 7a so that it is forced out therethrough. Thus, the provision of slit 7a in guide rail 8 makes it easy to compensate the over feeding of the strap due to mechanical inertia force.

Accordingly, with the second embodiment of the present invention, though the leading edge of the strap is not detected by means such as an electrical signal as in a conventional machine, the position of the leading edge of the strap is kept always substantially constant.

Figure 13:
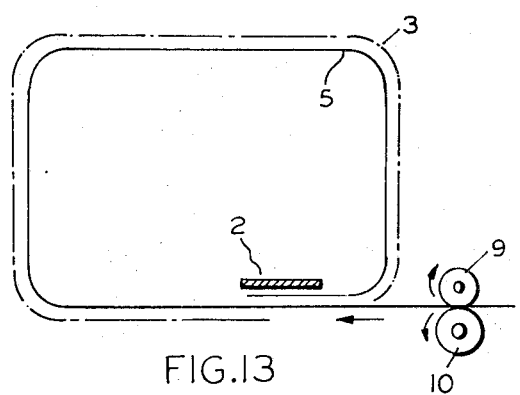
FIG. 13 is a diagrammatic view showing the state in which the strap feed has been completed.
Figure 14:
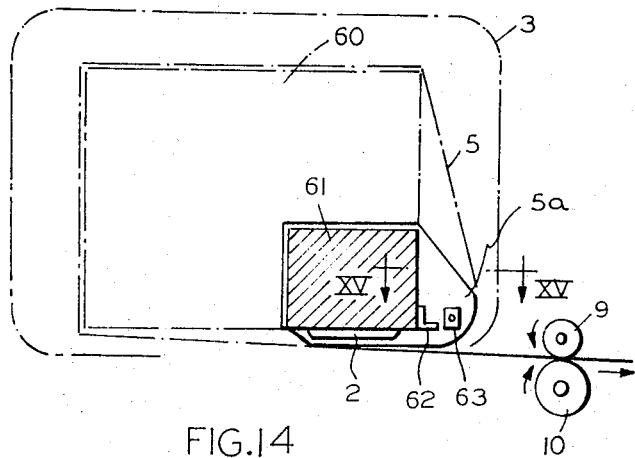
FIG. 14 is a diagrammatic view showing the final state of the strap when it is about to wind around a package to be strapped.

In the above embodiments, since the strap is fed to yoke 3 so as to just fill its inner surface, as shown in FIG. 13, the length of the strap fed is kept always substantially constant, apart from the variance due to the change in inertia of the rotating mechanical parts. After this state has been established, strap 5 is fastened around the package placed on table 2 within the confines of yoke 3 by rotating feed roller 10 in a direction indicated by the arrows as shown in FIG. 14. In this case, according to the size of the package, the length of strap 5 to be fastened around it is naturally different, as can be seen from FIG. 14. Consequently, during fastening, the length of the strap passing between presser roller 9 and feed roller 10 varies with the difference in size of the package to be strapped.

Because it is usual to operate the strapping machine at a constant speed regardless of the size of the package, the rotating time of the feed roller for fastening the strap is kept constant. Therefore, in a package which is large in size, as shown in FIG. 14 at 60, strap 5 is tightened around package 60 within a short time at the beginning of the fastening time and during the remainder of the time, feed roller 10 continues to rotate without moving the strap. This causes the roller to rub one portion of the strap, and can even lead to the severing of the strap or cause the power source to be overloaded. In order to avoid such difficulties, in the embodiments aforesaid, there is provided the magnetic clutch 55 between the power source and feed roller 10. However, a clutch, including the magnetic clutch, has the following defects:

(1) When large size packages are continuously strapped, since the clutch is always used in a slipping condition as stated above, the friction plates thereof are severely worn so that their life is shortened.

(2) When the clutch is adjusted to have a small frictional force in order to decrease the wear of its friction plates, the adjusted frictional force cannot be maintained due to a large change in coefficient of friction in case an oil drop, etc. gets between the friction plates.

(3) Because of the frequent interchange of the friction plates, it is necessary to frequently adjust the frictional force, which cause the maintenance of the machine to be troublesome.

In order to eliminate such difficulties pertaining to the embodiments aforesaid, a third embodiment is provided.

As shown in FIG. 14, if a package is placed on table 2 within yoke 3 with one of its bottom corners pressed against a positioning plate 62, the package 60 or 61 is placed in a definite place on table 2, regardless of its size, large or small, as shown at 60 or 61 in FIG. 13. Further, at the final stage that strap 5 is about to be wound around package 60 or 61, strap 5 is thrust out from yoke 3 at a substantially constant point 5a regardless of the size of the package. This is due to the constitution of yoke 3, which has a band 3a made of flexible material such as rubber fixed to each outer edge of the legs of the channel-like yoke 3 with a space therebetween as aforesaid (see FIG. 15).

When strap 5 is continued to be pulled to fasten the package by the reverse rotation of the feed roller, it is urged in the direction X of yoke 3 with the flexible members 3a being thrust aside in the direction Y, and contacts a flexible tip portion 63a of a detecting limit switch 63 arranged between yoke 3 and package 60 or 61, and electrically connected to the magnetic clutch 55. Limit switch 63 issues a signal confirming that the strap has passed by it.

When magnetic clutch 55, shown in FIG. 5, receives the signal from limit switch 63, it disengages armature 56 so that the rotation of shaft 53 is not transmitted to feed roller 10. Nevertheless, the feed roller thus disengaged from shaft 53 tends to continue to rotate due to its inertia force, so that it tightly winds the strap around the package 60 or 61 and then stops, although shaft 49 continues rotating for a time previously determined for fastening.

Feed roller 10, which has stopped its rotation, is subjected to a force urging it to rotate reversely due to the repulsive force caused by the elasticity of the strap or the package 60 or 61. Should the reverse rotation occur, the strap wound around the package tends to be loosened, which is not desirable because the fastening which has been achieved is made ineffective.

In order to prevent such reverse rotation of feed roller 10 which will loosen the fastening, in the present embodiment there is provided, in addition to the driving system shown in FIG. 5, a roller 64 mounted on a one-way clutch 65 which is mounted on the shaft 44. Roller 64 is adapted to be engaged with a friction pad 66 which is secured to the outer periphery of a roller 67 joined to a boss formed on the opposite side of gear 52 from the magnetic clutch 55, as shown in FIG. 5, by dotted lines and in detail in FIG. 9.

When disc 45 engages with driving disc 54 by the swing of rocker arm 39, roller 64 simultaneously engages with roller 67 through friction pad 66. When one-way clutch 65 is rotatable only in such a direction that feed roller 10 rotates in a direction to fasten the tape, feed roller 10 cannot rotate in a reverse direction to loosen the strap, even if a force is exerted tending to rotate it in such a direction. Accordingly, once the strap is wound around a package, it is not loosened again.

Though the detecting element has been shown as a limit switch in the above embodiment, it may be a photoelectric cell switch, and when a steel band is used as the strap material, the limit switch and the magnetic clutch may be replaced by mechanical elements.

While the invention has been shown and described with reference to preferred embodiments thereof, it will be apparent that other changes and modifications can be made the present invention and therefore it is understood that all changes, equivalents, and modifications within the spirit and scope of the present invention are here meant to be included in the appended claims.

What is claimed is:

1. In an automatic strapping machine, the combination of a table for supporting a package to be strapped in a strapping position, a feed roller for feeding or fastening said strap and a presser roller opposed thereto, a guide rail for guiding a strap between said rollers, a yoke at the end of the guide rail for leading the strap in a loop around the package, a strap guide at the end of the yoke, and a drive means for said feed roller comprising a first shaft on which said feed roller is secured, a first gear and a first driving disc secured to said first shaft, a second driving disc secured on said second shaft, a second gear secured on said second shaft, clutch means engageable with said second gear, said second gear being engaged with said first gear, a driving shaft adapted to be connected to a motor means, a rocker arm pivotally mounted on said driving shaft and having a cam follower roller on one end thereof, two shafts on the other end of said rocker arm, a gear secured to said driving shaft, a disc on each of said two shafts and coupled to the gear on the driving shaft, a cam means coupled to said motor means and engaging said cam follower for pivoting said rocker arm between a first position in which the disc on one of the two shafts is engaged with the driving disc on said first shaft and a second position in which the disc on the second of said two shafts is engaged with the driving disc on the second shaft, whereby the feed roller can be driven in one or the other direction for feeding the strap or pulling it tight around a package.

2. The combination as claimed in claim 1 wherein said guide rail has an opening in the upper wall thereof and said strap guide has a stop thereon so that, during the feed of the strap, when the strap is stopped with its leading edge in contact with said stop, the excess portion of the strap is forced out of said guide rail through said opening.

3. The combination as claimed in claim 1 wherein said machine is provided with a one-way clutch mounted on one of said shafts on said rocker arm, a first roller secured to said clutch, a further roller integral with said second gear with which said first roller is adapted to be engaged, and a strap detecting means disposed near the end of said yoke where the strap is pulled out of the yoke during the final stage of the fastening period of the strapping operation, said detecting means being connected to said clutch means, whereby said clutch means is released when said strap detecting means detects the movement of the strap out of said yoke.

References Cited

UNITED STATES PATENTS

| | | | |
|---|---|---|---|
| 2,195,043 | 3/1940 | Wright | 100—26 |
| 2,215,121 | 9/1940 | Harvey et al. | 100—26 XR |
| 3,046,871 | 7/1962 | Cheesman et al. | 100—26 |
| 3,086,451 | 4/1963 | Van Der Wal | 100—26 |
| 3,137,426 | 6/1964 | Brenneisen. | |
| 3,269,300 | 8/1966 | Billett et al. | 100—26 XR |
| 3,318,230 | 5/1967 | Hilton | 100—26 XR |

BILLY J. WILHITE, Primary Examiner

U.S. Cl. X.R.

100—26